United States Patent [19]
Braun et al.

[11] Patent Number: 5,411,174
[45] Date of Patent: May 2, 1995

[54] EMPTYING BALANCE HAVING A PRODUCT FLOW SETTING DEVICE

[75] Inventors: Thomas Braun, Schwaebisch-Hall; Werner Gwinner, Rosengarten, both of Germany

[73] Assignee: Optima-Maschinenfabrik Dr. Buhler GmbH & Co., Germany

[21] Appl. No.: 16,879

[22] Filed: Feb. 11, 1993

[30] Foreign Application Priority Data

Feb. 11, 1992 [DE] Germany ............. 42 03 883.9

[51] Int. Cl.[6] .......... G01G 13/06; B65G 53/46; B65G 65/40
[52] U.S. Cl. ................. 222/77; 222/545; 222/504; 222/556; 177/122
[58] Field of Search ........... 222/77, 504, 545, 556, 222/558, 557; 177/122; 92/62, 66

[56] References Cited

U.S. PATENT DOCUMENTS

| | | | |
|---|---|---|---|
| 1,942,617 | 1/1934 | Saurbrey | 222/545 |
| 2,749,940 | 6/1956 | Bronson, II | 222/545 X |
| 3,052,384 | 9/1962 | Clark | 222/504 X |
| 3,385,172 | 5/1968 | Kaminga | 92/62 X |
| 3,474,874 | 10/1969 | Peths, Jr. | 177/122 X |
| 3,904,416 | 9/1975 | Onoda et al. | 92/62 X |
| 3,913,448 | 10/1975 | Priestley et al. | 92/62 X |
| 4,010,695 | 3/1977 | Mantione | 222/545 X |
| 4,162,766 | 7/1979 | Tenbroeck et al. | 222/545 X |
| 4,372,730 | 2/1983 | Ladt | 222/504 X |
| 4,691,617 | 9/1987 | Purkott | 92/66 X |
| 4,944,428 | 7/1990 | Gmür et al. | 222/77 X |
| 5,121,638 | 6/1992 | Gmur | 222/58 |
| 5,199,612 | 4/1993 | Raque | 222/504 X |

FOREIGN PATENT DOCUMENTS

| | | | |
|---|---|---|---|
| 1205307 | 11/1965 | Germany . | |
| 1948182 | 8/1966 | Germany . | |
| 2015048 | 10/1971 | Germany . | |
| 7303783 | 5/1973 | Germany . | |
| 8004840 | 2/1980 | Germany . | |
| 3100577 | 7/1982 | Germany | 177/122 |
| 3108121 | 9/1982 | Germany . | |
| 3536347 | 10/1986 | Germany . | |
| 0709485 | 1/1980 | U.S.S.R. | 222/545 |

*Primary Examiner*—Andres Kashnikow
*Assistant Examiner*—Anthoula Pomrening
*Attorney, Agent, or Firm*—Quarles & Brady

[57] ABSTRACT

An emptying balance contains a product flow setting device, which contains a rotary slide valve. The angle between a rotary slide valve wall and the facing fixed wall is consequently dependent on the opening position of the rotary slide valve. A fine blocking flap is also provided which is opened by means of two pressure cylinders arranged in series, and which are individually controllable. For subsequent metering of small product quantities only one of the two pressure cylinders is operated and this only leads to a limited opening of the fine blocking flap.

7 Claims, 2 Drawing Sheets

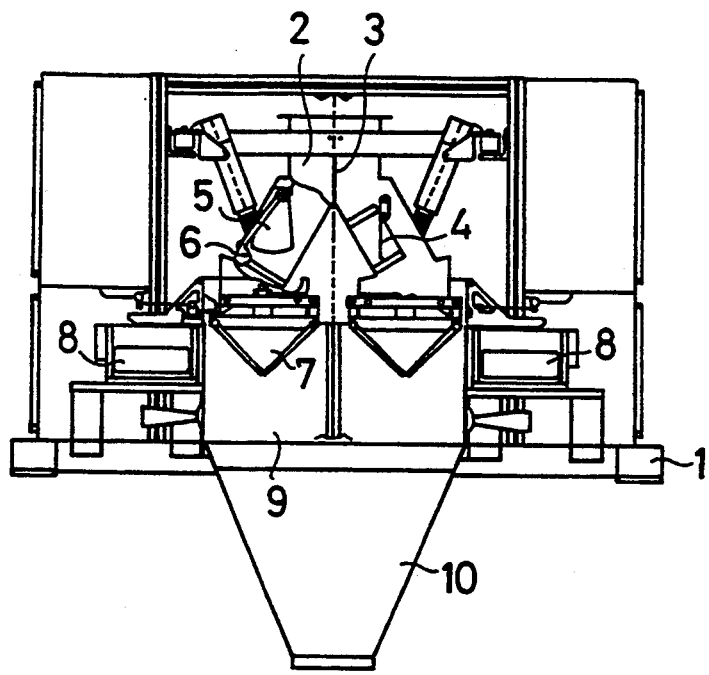
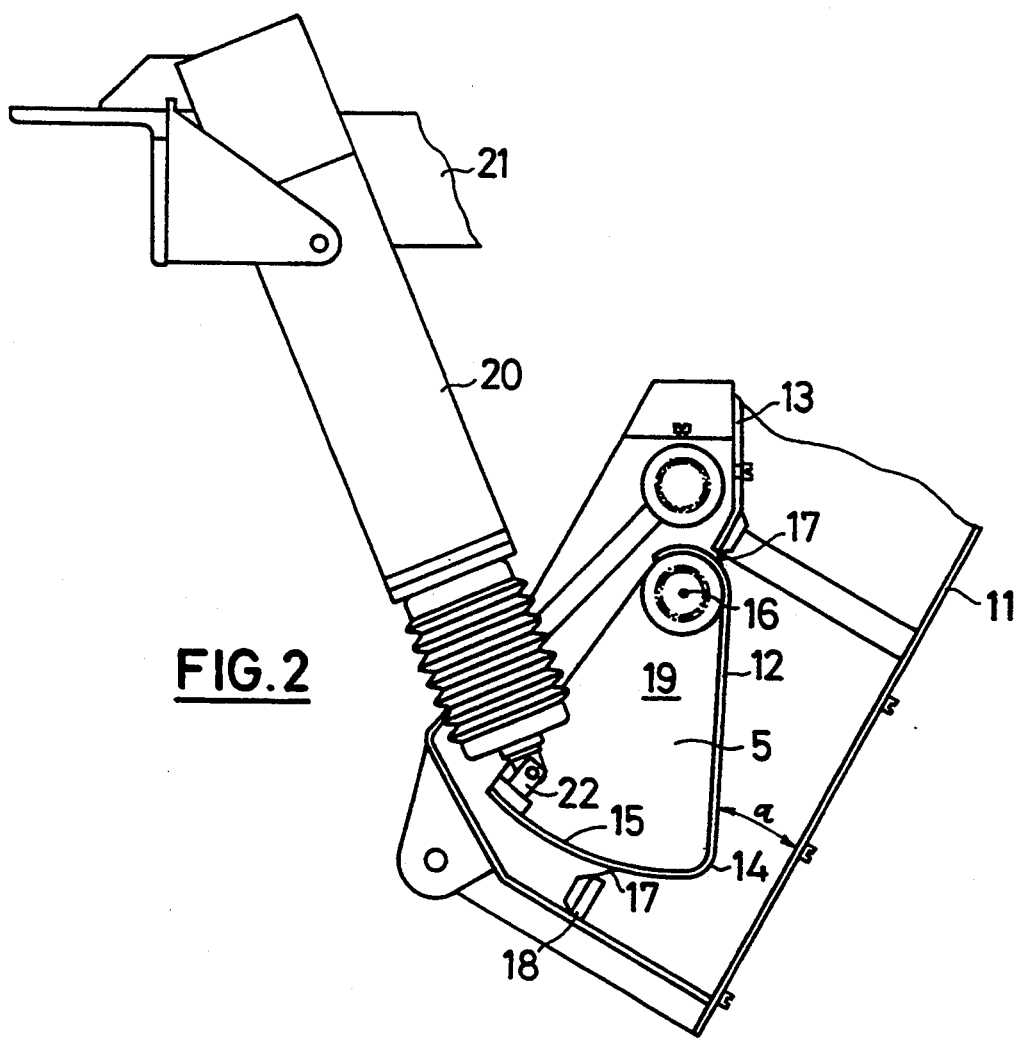

EMPTYING BALANCE HAVING A PRODUCT FLOW SETTING DEVICE

BACKGROUND OF THE INVENTION

The invention relates to an emptying balance.

Emptying balances have a product supply, in which a product flow can be set with the aid of an adjustable slide valve. The product flow to be set is, among other things dependent on the material to be emptied.

Linear slide valves are known from the prior art. Such slide valves have, for example, a flat metal plate, which is adjustably fixed in its own longitudinal direction. The lower edge of the slide valve facing a fixed wall determines the cross-section of the passage. The closer the slide valve is moved to the fixed wall, the smaller the through-flow or product layer height. However, on adjusting the slide valve, the angle between it and the fixed wall does not change. If an automatic adjusting device is to be used, it can lead to problems in the case of the known slide valves. As a result of the high product pressure there can be a tilting of the linear guide and consequently difficulty in operation occurs. Moreover, during linear adjustment in the product flow, a deposition can occur in the case of sticky or aggressive materials and this also makes adjustment difficult.

In accordance with the invention the product flow setting is improved in such a device, such a way that it is easier to operate and the product flow characteristics are improved.

SUMMARY OF THE INVENTION

For solving this problem the invention proposes a product flow setting or an emptying balance having the features of claim 1. Further developments form the subject matter of subclaims.

The construction of a slide valve wall as part of a rotary slide valve makes it possible to make the bearing and therefore adjustment possibility easier and insensitive to dirtying and deposition. Simultaneously, as a result of the variability of the angle between the slide valve wall the product flow characteristics are improved during adjustment, so that with the emptying balance proposed by the invention it is possible to have larger stable product layer heights.

According to the invention for adjusting the slide valve wall a drive can be provided, so as to make adjustment easier and it can, e.g., be made up of a hand wheel.

However, it is also possible and is proposed by the invention, that the drive has an operating cylinder, which is automatically controllable. This makes it possible to or simplifies automation of the slide valve adjustment.

The operating cylinder can, e.g., be constructed as an electromotive elevating spindle drive or also as a pneumatic, hydraulic or similar cylinder. It is also possible to use another drive, which acts on the rotary slide valve. In place of a complicated linear guide, it is possible to use a dirtying-insensitive pivot bearing. The rotary slide valve can be relatively easily sealed by leaf springs.

According to the invention, the rotary slide valve axis can be located on the slide valve wall side remote from the fixed wall and is physically formed by a shaft or journals. Therefore, the pivot bearing of the rotary slide valve is located at a point where it is not exposed to the product flow.

According to a further development of the invention, in addition to the slide valve wall, the rotary slide valve has a wall portion which is located on a circular cylindrical portion, whose axis coincides with the rotation axis. On pivoting the slide valve, the wall portion consequently moves in a cylindrical portion, i.e. on a fixed radius. It is therefore very simple to seal the rotary slide valve part, so that also at this point a seal against dirtying or influencing by the product to be emptied is ensured.

In general, following onto the device for setting the product flow, emptying balances have blocking flaps making it possible to interrupt the product flow, if the product quantity necessary for an emptying process has been reached. In order to obtain an accurate emptying weight, it is standard practice to subdivide the overall product flow into a coarse flow and a fine flow, so that the flows can, in each case, have its own blocking flap.

If after interrupting the product flow the balance finds that the desired weight has not yet been reached, then an additional small product quantity must be added. For this purpose it is conventional practice to briefly open the fine blocking flap several times until the nominal weight is reached. This brief opening takes place with the aid of a pressure cylinder for opening the fine blocking flap. However, the brief opening cannot be accurately reproduced, because for the same control time of the valve there can be considerable variations in flap opening by the cylinder due to different limiting conditions, e.g. pneumatic pressure, ambient temperature, dirtying and wear to components, i.e. the fine blocking flap opening angle can differ significantly.

In order to improve this situation, according to a further development of the invention, for opening and closing the blocking flap, and in particular the fine blocking flap, use is made of a member permitting a reproducible and only partial opening of the blocking flap. For subsequent metering, it is possible in this way to only partly open the blocking flap or fine blocking flap, so that only small amounts of the product can pass through the opening. This allows an exact after-metering, and for this purpose suitable drives can be used.

According to a further development, the invention proposes a drive, in which two operating cylinders operate in series. In particular, the cylinders can be mechanically arranged in series, and are individually controllable. Thus, in normal metering operation, e.g., both cylinders can be controlled, so that their action is summed. However, for subsequent metering e.g. only one of the two cylinders is controlled, e.g. cylinder having a small stroke. In the case of cylinders with a small stroke, changes to the limiting conditions only lead to limited variations in the opening angle. It is obviously also possible to employ both cylinders with different opening or control characteristics, which also permits an improvement to the metering accuracy.

Thus, during the after-supply of product, preferably only the small stroke cylinder is selected or controlled, which opens the fine blocking flap in clearly defined manner, and in this way allows for a more accurate subsequent inflow.

BRIEF DESCRIPTION OF THE DRAWINGS

Further features, details and advantages of the invention can be gathered from the following description of a preferred embodiment and the attached drawings, wherein:

FIG. 1 is diagrammatic general view of an emptying balance;

FIG. 2 is a diagrammatic view, on a larger scale, of a rotary slide valve for product flow setting;

DETAILED DISCUSSION

Figure 3:
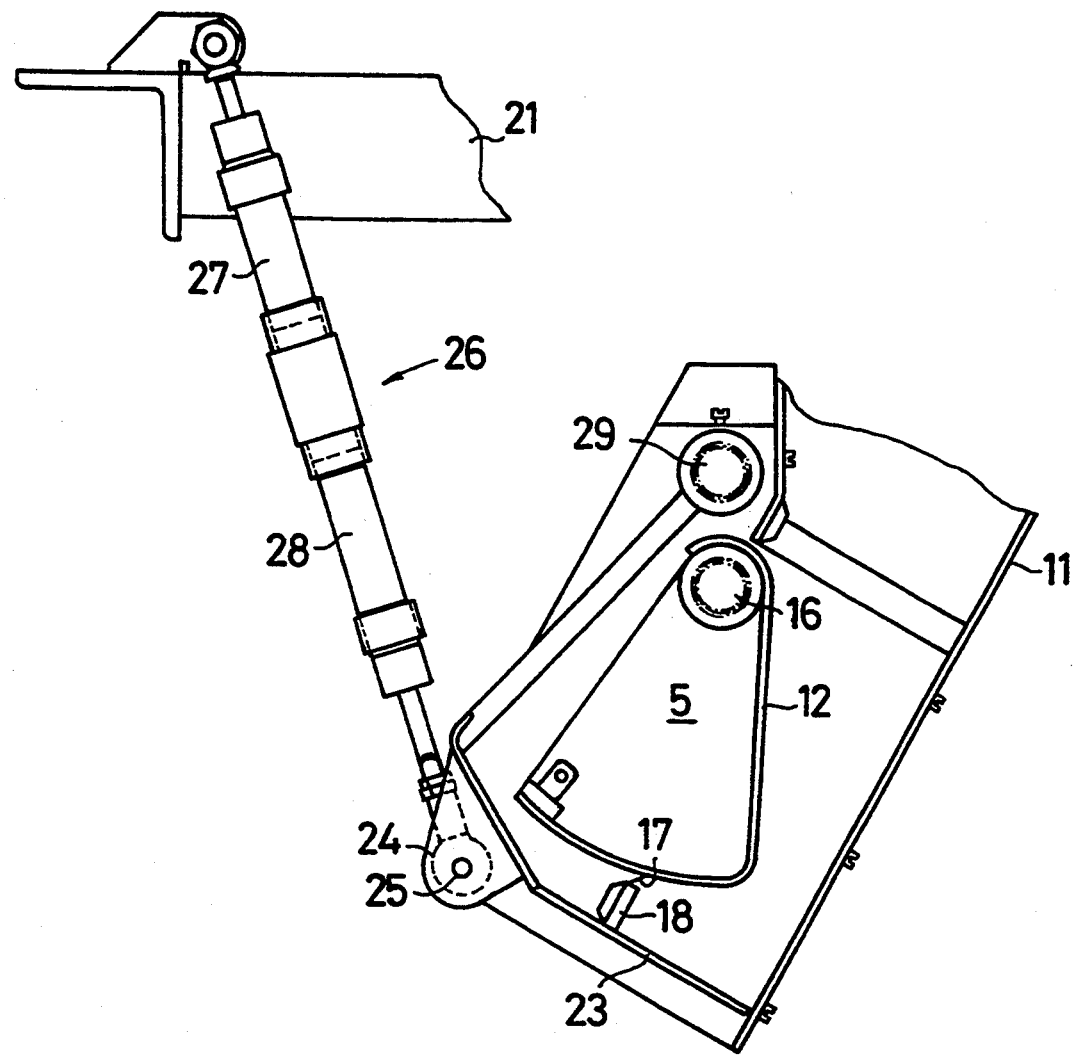
FIG. 3 is a diagrammatic view, on a larger scale, of an actuator for a fine blocking flap.

FIG. 1 shows diagrammatically in a general arrangement drawing an emptying balance, which contains a machine frame 1 on which are located the different components. The product to be weighed and emptied is supplied through a supply shaft 2, which is centrally subdivided by a partition 3. It leads to two metering devices 4, in which is located in each case a rotary slide valve 5 for setting the product flow and following onto this, a blocking flap 6 for interrupting the product flow. Below the blocking flap 6 is in each case provided the left-hand pan 7 for the weighing apparatus 8. The weighed product is then fed via a discharge box 9 into a discharge hopper 10, from where it drops into the packing.

FIG. 2 shows on a larger scale details of the metering devices 4. FIG. 2 shows the rotary slide valve 5 for product flow setting purposes. The product is passed between a fixed wall 11, which is planar in the embodiment shown, and a facing wall 12, which is part of the rotary slide valve 5. The slide valve wall 12 is inclined with respect to the fixed wall 11. Above the rotary slide valve 5 there is a hopper wall 13 which is also inclined with respect to the fixed wall 11 and which defines the product flow upstream of the dosing device. In its lower area the slide valve wall 12 is bounded by a rounded edge 14, which simultaneously forms the point of smallest spacing between the wall 12 and the fixed wall 11. Together with the transverse extension measured transversely to the drawing plane, this spacing defines the cross-section for the product flow. To the rounded edge 14 is connected a wall portion 15, which is part of a circular cylinder.

The rotary slide valve is pivotable about a shaft 16, which is located on the side of the slide valve wall 12 remote from the fixed wall 11. Bearing can take place with the aid of a through shaft or with the aid of journals. The slide valve wall 12 is drawn in its upper area around the shaft 16, so that independently of the valve position, said bearing is protected with respect to the product flow. In addition, to the end of the hopper wall 13 associated with the slide valve wall 12 is fixed a leaf spring 17, which covers and seals the small gap between the hopper wall 13 and the rotary slide valve 5.

On pivoting the rotary slide valve 5 the lower wall portion 15 moves on a circular arc about the shaft 16. Thus, this area of the rotary slide valve can be sealed with the aid of a leaf spring 17 fixed to the transverse beam 18. In the vicinity of its front faces the rotary slide valve 5 has front plates 19, which are shaped roughly in the form of circular sectors.

The rotary slide valve is pivoted by means of an operating cylinder 20, articulated on the one hand to a part 21 of the machine frame 1 and on the other to a shoulder 22 of the valve 5. The shoulder 22 is located on the inside of the curved wall portion 15, so that it is also located in an area sealed with respect to the product flow. This operating cylinder can, e.g., have an electromotive lifting spindle drive.

The more the rotary slide valve is opened the smaller the angle becomes between the fixed wall 11 and the valve wall 12, so that a high degree of stability is obtained in the case of large product layer heights.

FIG. 3 shows a detail from the same part of the emptying balance as in FIG. 2, but in this case the operating cylinder 20 for the rotary slide valve is omitted, because FIG. 3 is only intended to show the operation of the fine blocking flap 23, which blocks the product flow immediately behind the slide valve for product flow setting purposes. The subsequently described operation of the fine blocking flap 23 can also occur in the case of emptying balances, in which the slide valve for product flow setting has a different construction to that specifically described with reference to FIG. 2.

In cross-section the blocking flap 23 is roughly L-shaped and in the closed state of the flap 23 the lower leg of the L passes as a continuous metal plate roughly perpendicular to the surface of the fixed wall 11. Onto the outside of the fine blocking flap 23 is fixed, e.g., by screwing a clip 24 with a ring 25. To said ring 25 is articulated one end of a linear drive 26, whose other end is articulated to the machine part 21. In reciprocal axial extension the linear drive has two pressure cylinders 27, and 28, which can in each case be controlled or selected to operate independently of one another. For opening the fine blocking flap 23 during normal metering, both the pressure cylinders 27, and 28 are shortened, which leads to a pivoting of the flap 23 about the pivot pin 29, which is positioned above the shaft 16 for the rotary slide valve 5.

If only a small amount of the product to be emptied is to be delivered for subsequent metering purposes, by operating only one of the two pressure cylinders, e.g. the shorter cylinder 27, the blocking flap 23 is pivoted by only a small amount. Therefore only a small amount of product passes into the weighing apparatus located below the metering devices. As a result of the shorter stroke this opening movement and therefore the subsequent metering possibility is much more accurate than would be possible by controlling the entire linear drive 26 with the aid of both cylinders.

In the embodiment shown in FIG. 3 use is made of a drive, which has two pressure cylinders connected in series. It is obviously possible to use other drives for this purpose, which need not necessary be linear drives. Thus, it is, e.g., also conceivable to use an operating cylinder, which can alternately have a large and a small stroke and which is controllable in such a way that it only slightly opens the blocking flap for fine metering purposes.

We claim:

1. An emptying balance for a product with a product flow setting device, comprising: a fixed wall, a slide valve wall positioned facing the fixed wall and being inclined with respect to the fixed wall, the slide valve wall forming with said fixed wall a passage for the product, the passage cross-section being determined by a minimum spacing between the two walls; the slide valve wall being adjustable for varying the minimum spacing from the fixed wall; the slide valve wall being part of a rotary slide valve and being pivotable about a shaft located in its upper area; and a blocking flap for selectively blocking a flow of product being passed through said flow setting device until a predetermined value of product is accumulated adjacent said blocking flap and for passing said predetermined value of product by being selectively opened, wherein the rotary slide valve has a wall portion extending from the slide valve wall in a circular cylindrical arc about the shaft.

2. An emptying balance according to claim 1, wherein a drive is provided for adjusting the slide valve wall.

3. An emptying balance according to claim 2, wherein the drive has an operating cylinder.

4. An emptying balance according to claim 1, wherein the shaft of the rotary slide valve is located on the side of the slide valve wall remote from the fixed wall.

5. An emptying balance according to claim 1, wherein said blocking flap is pivotable for blocking the product flow, and having a drive for operating the blocking flap, wherein the drive is constructed in such a way that it is controllable for partially opening the blocking flap.

6. An emptying balance according to claim 5, wherein the drive is formed by two operating cylinders connected in series and arranged to be controllable independently of one another.

7. An emptying balance according to claim 5, wherein the controllable drive is configured to be operated on said blocking flap for fine metering an amount of product passed to a scale after an initial gross metering of the predetermined value to arrive at a desired amount of product.

* * * * *